A. H. SNYDER.
STORAGE BATTERY.
APPLICATION FILED JULY 13, 1920.

1,363,685.

Patented Dec. 28, 1920.
2 SHEETS—SHEET 1.

Inventor
Almond H. Snyder
By his Attorneys
Kenyon & Kenyon

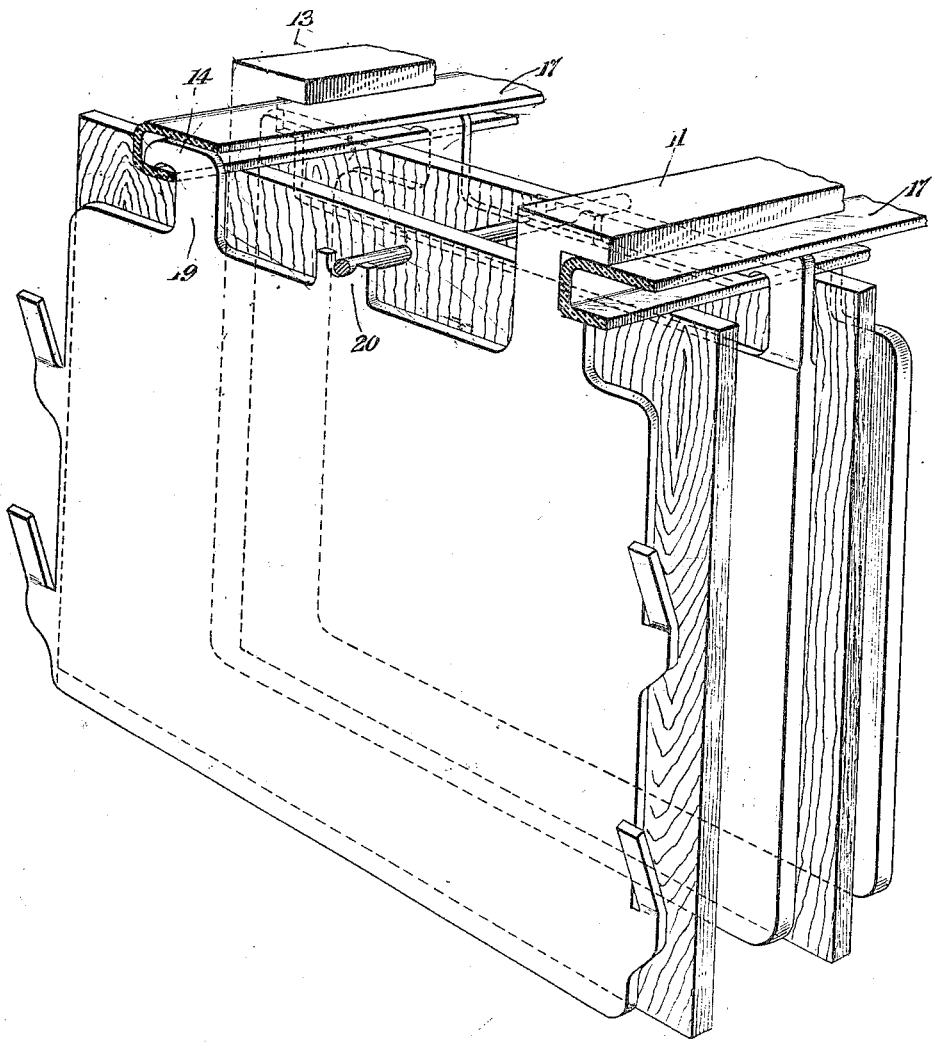

UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE BATTERY.

1,363,685.  Specification of Letters Patent.  Patented Dec. 28, 1920.

Application filed July 13, 1920. Serial No. 395,979.

*To all whom it may concern:*

Be it known that I, ALMOND H. SNYDER, a citizen of the United States, residing at 32 Lombardy street, Lancaster, county of Erie, and State of New York, (whose post-office address is 32 Lombardy street, Lancaster, N. Y.,) have invented certain new and useful Improvements in Storage Batteries, of which the following is a specification.

My invention relates to storage batteries and particularly to means for supporting free ends of the plates and also means for supporting separators in place.

My invention will be better understood by reference to the following specification in connection with the accompanying drawings forming a part thereof in which—

Fig. 2 shows in perspective some of the parts assembled but separated in order to more clearly show the relation of the parts.

Figure 1:
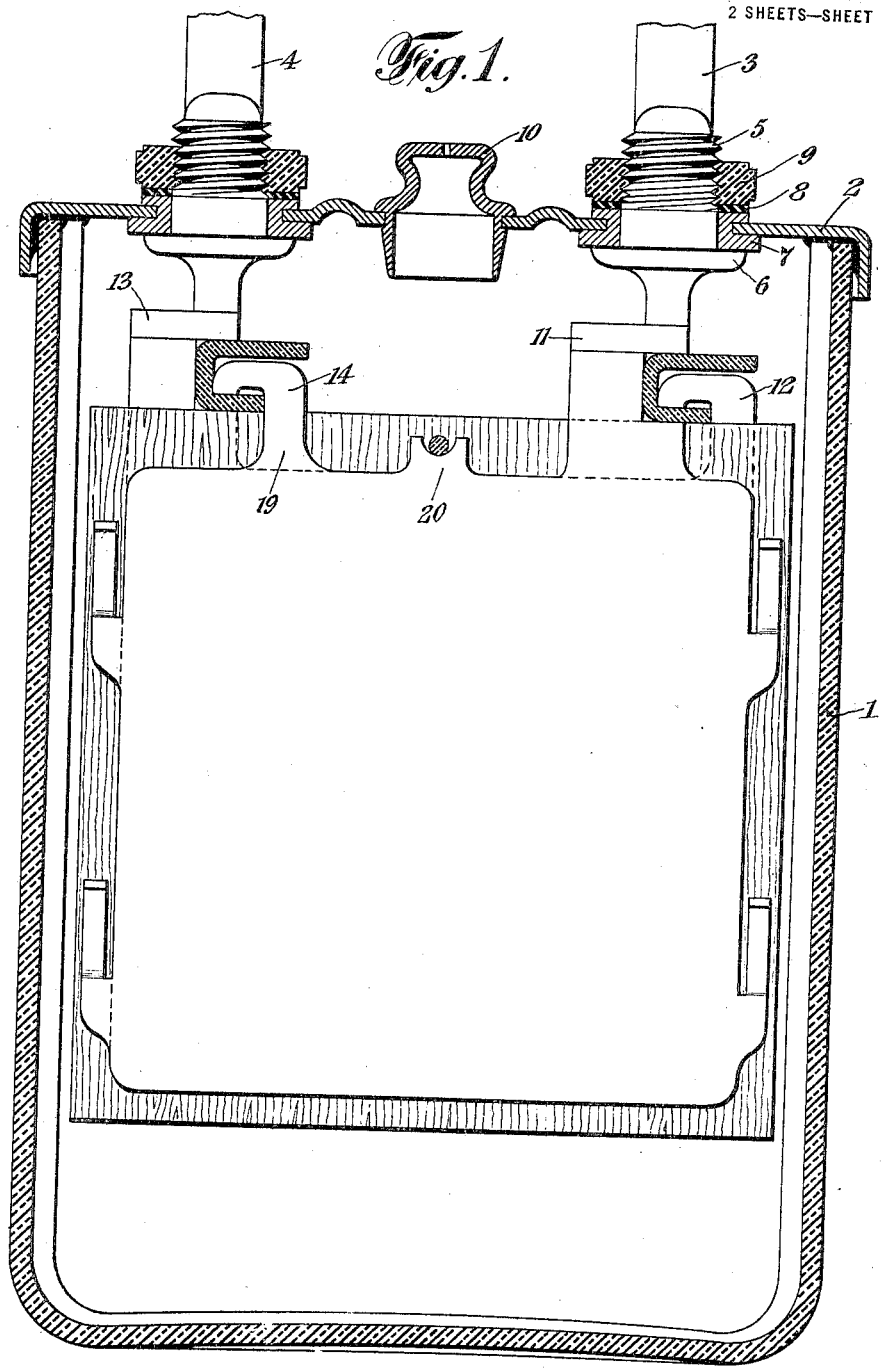
Figure 1 shows a sectional elevation of a battery.

The battery comprises the usual jar or container 1, and a cover 2, which is composed of a lead antimony compound and stamped in the form desired. Passing through openings in the cover 2 are terminals 3 and 4, one for the negative plates and one for the positive plates. The connection of the terminals with the cover is the same in both cases and, therefore, a description of one will be sufficient. The terminals are screw-threaded at 5 and have an enlarged portion 6 which engages a member 7 fastened in an opening in the cover 2. Placed upon the member 7 is a gasket 8 and connecting with the screw-threads 5 is a hard rubber or other similar nut 9. When the nut 9 is screwed into place the enlarged portion 6 is drawn up tightly against the member 7 and the terminal is securely connected to the cover 2. Likewise, the terminal 4 is connected with the cover 2. Placed at some suitable point is a ventilator and filling cap 10. Connected with the terminal 3 by means of the bus bar 11 are plates 12 and similarly connected to the terminal 4 by means of the bus bar 13 are plates 14. Each of the plates 12 which are connected at one end to the terminal 11 has a free end with a projection 15 thereon extending upwardly and laterally in one direction and having a horizontal supporting surface; likewise, each of the plates 14 is connected to the bus bar 13 and has a free end with a projection 16 extending upwardly and laterally in one direction with a horizontal supporting surface.

A supporting member 17 of insulating material is placed under the horizontal supporting surface of the extensions 15 and 16 and rests upon and is supported by the adjacent plates of opposite polarity which are supported at that end by means of their connection with the bus bars and terminals which in turn are supported by the cover of the jar.

The supports 17 are of general U shape, in cross-section, having one side 18 longer than the other side 19. The short side 19 constitutes the support for the free ends of the plates, and the side 18 forms a cover extending over the upward projections and acts to shield the same and prevent short-circuits.

The outside negative plates of the cell have projections 20 extending upwardly from the center thereof, the projections being provided with a groove portion which receives a rod 21. The rod 21 passes through the separators 22 and supports the same in position as shown.

From the foregoing it will be noted that the entire interior structure of the battery is supported from the cover of the jar by the means described, thus eliminating the necessity of providing special supports inside the jar with the consequent expense and trouble involved by such construction.

Having described my invention, what I now claim as new and desire to secure by Letters Patent is:—

1. In a storage battery the combination of a jar containing positive and negative plates, each having a terminal and a free end, the terminal and free ends of the positive and negative plates being grouped and connected together respectively at opposite sides of the jar, a projection on the free end of each plate extending upwardly and laterally in one direction only, and having a horizontal supporting surface and a support having a portion engaging said horizontal surface and resting on the plates of opposite polarity and having also a portion extending entirely over the top of said projections.

2. A support for the free end of the plates of a storage battery of the usual type in which the plates of like polarity are connected to a common terminal at opposite sides of the cell comprising an insulating member of general U shape having one side longer than the other and arranged to be held in place transversely of the plates and to rest on the terminal end of one group of plates to support the free end of the plates of the other group by supporting lugs rising from said plates and resting on top of the short side of said support, the long side of said support acting as a cover for said lugs.

In testimony whereof I have signed my name to this specification.

ALMOND H. SNYDER.